(12) United States Patent
Tapper

(10) Patent No.: US 6,910,401 B2
(45) Date of Patent: Jun. 28, 2005

(54) CABLE-STRIPPING PLIERS

(75) Inventor: Johan Tapper, Hedemora (SE)

(73) Assignee: Pressmaster AB, Alvdalen (SE)

( * ) Notice: Subject to any disclaimer, the term of this patent is extended or adjusted under 35 U.S.C. 154(b) by 324 days.

(21) Appl. No.: 10/307,396

(22) Filed: Dec. 2, 2002

(65) Prior Publication Data

US 2003/0110898 A1 Jun. 19, 2003

(30) Foreign Application Priority Data

Dec. 19, 2001 (SE) .............................................. 0104298

(51) Int. Cl.$^7$ ................................................ H02G 1/12
(52) U.S. Cl. ........................... 81/9.43; 81/9.41; 30/90.1
(58) Field of Search ........................ 81/9.4, 9.41, 9.42, 81/9.43, 9.44; 30/90.1, 90.4, 90.8, 262

(56) References Cited

U.S. PATENT DOCUMENTS

| | | | | |
|---|---|---|---|---|
| 72,735 A | * | 12/1867 | Henry ........................ | 30/262 |
| 875,717 A | * | 1/1908 | Low ........................... | 30/262 |
| 3,915,037 A | | 10/1975 | Wiener ....................... | 81/9.5 A |
| 4,112,791 A | | 9/1978 | Wiener ....................... | 81/9.5 A |
| 4,377,954 A | * | 3/1983 | Schulze ...................... | 81/9.43 |
| 4,407,174 A | * | 10/1983 | Schulze ...................... | 81/9.42 |
| 5,046,252 A | * | 9/1991 | Ayuta et al. ................ | 81/9.44 |
| 5,245,894 A | * | 9/1993 | Undin ......................... | 81/9.43 |
| 5,491,894 A | * | 2/1996 | Bieganski ................... | 81/9.43 |
| 5,572,911 A | | 11/1996 | Schmode et al. ........... | 81/9.43 |
| 5,724,870 A | | 3/1998 | Wiebe et al. ................ | 81/9.43 |

* cited by examiner

*Primary Examiner*—Hadi Shakeri
(74) *Attorney, Agent, or Firm*—Jacobson Holman PLLC

(57) ABSTRACT

Cable-stripping pliers having between its clamping jaws a cutting unit with mutually co-acting arms including cutting elements. The cutting unit has an abutment body which is movable in the longitudinal direction of the pliers and which limits the stripping length. The body Includes a latching device for latching the arms together in their closed state. The latching device includes a latching finger that engages a recess in the other arm when the abutment body is displaced to one end and the arms are brought together. The Cable-stripping pliers is arranged so that the cutting unit is removed easily when the clamping jaws are open and the cutting unit is in its closed state.

9 Claims, 2 Drawing Sheets

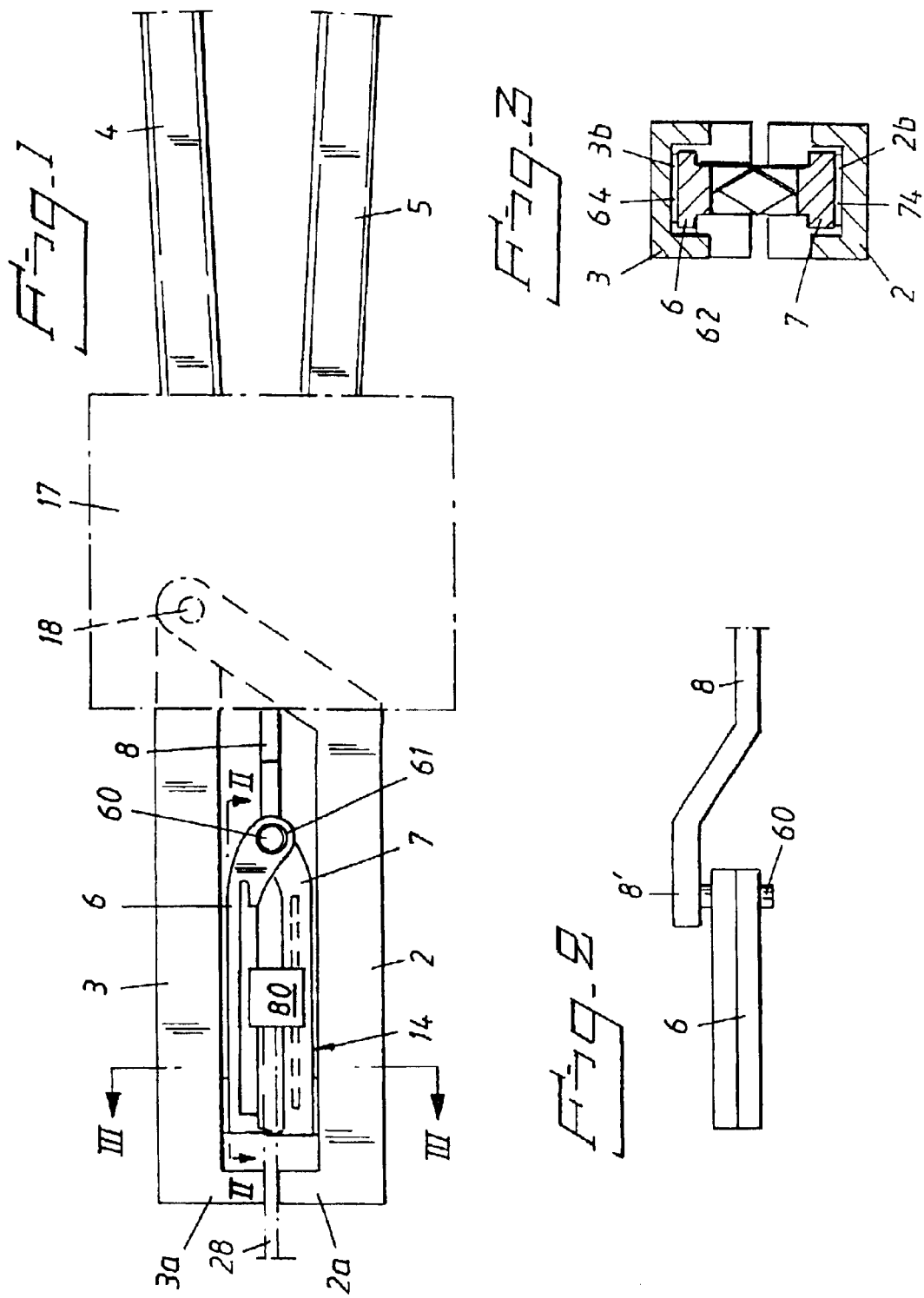

CABLE-STRIPPING PLIERS

FIELD OF THE INVENTION

The present invention relates to cable-stripping pliers and a cutting unit that can be used with the pliers.

BACKGROUND OF THE INVENTION

The invention thus relates to cable-stripping pliers of the kind disclosed in U.S. Pat. No. 3,915,037 and U.S. Pat. No. 4,112,791 for example.

Such cable-stripping pliers include two clamping jaws that are mounted for pivotal movement in relation to each other and which include two co-acting clamping elements for gripping a cable to be stripped, two legs which are pivotal in relation to each other for pivotally driving the clamping jaws, a cutting unit including two pivotally mounted arms which are spring-biased in a direction away from each other and which have mutually co-acting cutting means at their free ends for cutting through a cable casing to be stripped from the cable, wherein the cutting unit is received between the clamping jaws and adapted for movement therealong, wherein guide means are provided for guiding the cutting unit along the clamping jaws, and wherein a pull rod is connected to the cutting unit, wherein there is further included a mechanism which is connected to the clamping legs, on the one hand, and to the clamping jaws and the pull rod, on the other hand, wherein the mechanism is adapted to initially allow the clamping elements and the cutting unit to engage the cable when closing the clamping jaws, and thereafter, with an essentially retained closure grip, to withdraw the pull rod, and therewith the cutting unit, upon continued closure of the clamping legs, with the cable gripped by the clamping elements.

SUMMARY OF THE INVENTION

It is difficult to replace the cutting devices or cutting unit in previously known cable-stripping pliers. Consequently, one object of the invention is to provide cable-stripping pliers with which the cutting unit can be easily replaced.

A further object of the invention is to provide a cutting unit which can be readily locked in a closed state so as to reduce the risk of personal injury by the cutting elements of the cutting unit, before or after assembling/dismantling the cutting unit. A further object is to provide a cutting unit design in which latching is combined with an abutment means for determining the cable stripping length.

The object is achieved, either fully or partially, with cable-stripping pliers constructed in accordance with the invention. The invention is defined in the accompanying independent Claims.

Embodiments according to the invention are defined in the accompanying dependent Claims.

The inventive pliers enables the cutting unit to be changed quickly and simply, and therefore enables a cutting unit to be readily changed when its cutting element has become blunt, or when a cutting element with another type of cutting device (adapted to some other type of cable) is required.

The cutting unit can be closed by bringing the legs of the pliers together and can be latched in its closed state by means of the latching arrangement. When the legs of the pliers are moved apart, the clamping elements are opened, wherewith the arms of the cutting unit are no longer urged towards the clamping jaws by the biasing force of the spring. This enables the cutting unit to be moved easily along the pin, i.e. away from the space between the clamping elements. Since the arms of the cutting unit and the cutting element are in engagement with each other, there is less risk of personal injury when manually handling the cutting unit, both prior to fitting the unlit to the pliers and subsequent to removal of said unit therefrom.

The present invention will now be described in more detail by way of example and with reference to the accompanying drawings.

BRIEF DESCRIPTION OF THE DRAWINGS

FIG. 1 is a side view of cable-stripping pliers constructed in accordance with the present invention;

FIG. 2 illustrates part of a connection between a cutting unit and a pull rod forming part of the pliers;

FIG. 3 is a schematic sectional view taken on the line III—III in FIG. 1;

DETAILED DESCRIPTION OF THE PREFERRED EMBODIMENTS

Figure 4:
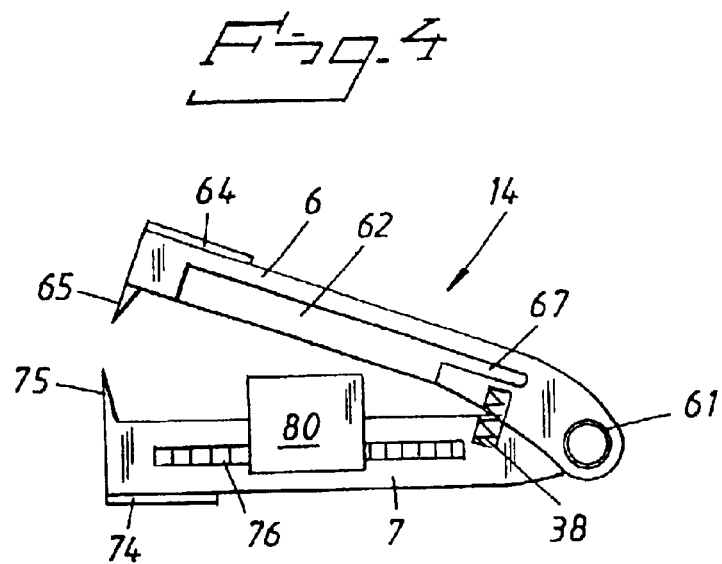
FIG. 4 is a schematic side view of a cutting unit.

FIG. 1 illustrates schematically cable or wire stripping pliers that include mutually pivotal handgrip legs 4, 5 which, through the medium of a pliers mechanism 17, are coupled to mutually pivotal clamping jaws 2, 3 which carry at their free ends clamping elements 2a, 3a for gripping a cable 28 to be stripped. A cutting unit 14 is located between the jaws 2, 3. The cutting unit includes a tubular pivot mounting 61 whose axis extends normal to a plane which is "tented" by the pivotal movement of the jaws 2, 3.

The clamping jaws 2, 3 can be considered to be pivotally mounted relative to one another about an axis 18.

The tubular pivot mounting 61 between the arms 6, 7 of the cutting unit 14 receives a co-axial pin 60 which is free-bearing from an end-part 8' of a pull rod 8 that is caused to move axially in the longitudinal direction of the pliers by the mechanism 17 when said mechanism is activated by mutual pivoting of the pliers' legs 4, 5.

Provided at the freely-movable end of the unit 14 are cutters 65, 75 which co-act to cut a break line through the casing on the cable 28 to be stripped. Movably mounted on one arm 7 is an abutment 80 which defines the length of cable to be stripped, i.e. the distance between the body 80 and the cutters 65, 75 when the pliers are open.

The mechanism 17 is of a well known kind, in which closing of the pliers legs 4, 5 also causes the clamping jaws 2, 3 to close so that the clamping elements 2a, 3a will grip the cable 28 therebetween, wherein the clamping jaws 2, 3 also drive the arms of the cutting unit 14 towards each other and therewith cause the cutters 65, 75 to cut break lines in the cable casing. In response to continued closing of the legs 4, 5, the mechanism 17 causes the jaws 2, 3 to essentially retain their pivot positions, while said mechanism 17 withdraws the pull rod 8 and therewith the cutting unit 14, so that the cutters 65, 75 entrain the cable casing that was initially situated between the cutters 65, 75 and the abutment 80.

A mechanism 17 of this kind is well known and forms no part of this invention. A purposeful description of such a mechanism 17 is given, for instance, in U.S. Pat. No. 4,112,791 and U.S. Pat. No. 3,915,037, the contents of which are incorporated in this document.

It will be seen from FIG. 2 that the end-part 8' of the pull rod carries one end of a freely projecting pin 60 which extends in a direction normal to the movement plane of the jaws 2, 3, said part being shown slightly displaced in parallel from the connecting part of the pull rod 8. As will be seen from FIG. 3, the clamping jaws 2, 3 include guide grooves 2b, 3b which receive slide shoulders 64, 74 on the arms 6, 7. It will be seen from FIG. 4 that a spring 38 functions to force the arms 6, 7 apart and into engagement with the grooves 2b, 3b. Located at the ends of the arms 6, 7 are generally V-shaped blades which engage each other so as to cut four circumferentially spaced break lines around the cable.

Figure 5:
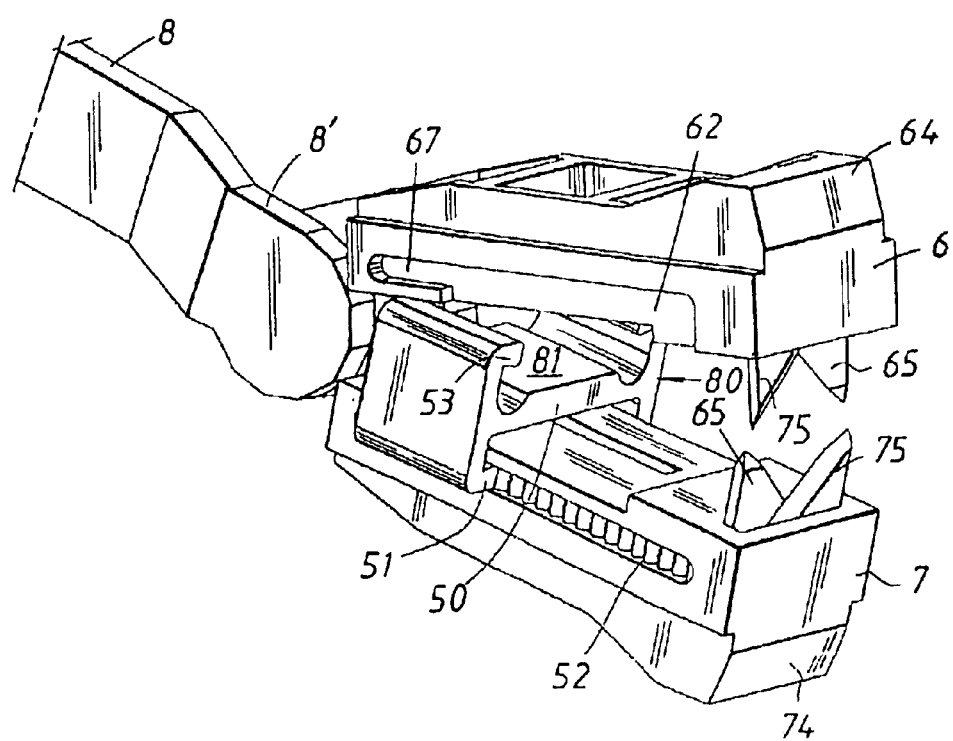
FIG. 5 is a perspective view of the cutting unit carried by the pull rod.

As shown in FIGS. 4 and 5, an abutment body 80 is mounted for displacement along one arm 7 and has a latch tongue 51 which releasably engages between respective teeth in a row of teeth 52, 76 on the arm 7, so as to set the body 80 in a chosen position along the arm 7.

As will be seen from FIG. 5, the body 80 has a front abutment surface 50 which forms an end stop for the cable 28 when inserting the cable into the cutting unit of the pliers.

The body 80 includes mutually opposing flanges/tongues 51 which engage with a respective row of teeth 52 on each of the opposite sides of said one arm 7.

It will also be seen that the body 80 carries mutually opposing latching fingers 53 which extend along a respective recess 62 on opposite sides of the unit arm 6, along the movement path of the body 80 from its forward end position in the proximity of the cutting elements, and a movement position withdrawn towards the bearing 61, even when the arms 6, 7 are essentially fully closed against one another. Provided in the side surfaces of the arm 6, in the vicinity of the end of the arm 6 connecting with the pivot bearing 61, is a groove 67 which receives the latching fingers 53 when the body is displaced to its rear end position. The latching arrangement formed by the fingers 53 and the grooves 67 lock the arms 6, 7 in their mutually closed state, in which the culling elements 65, 75 mutually engage so as to minimize the risk of injury. The latching tongues 51 and the rows of teeth 52 co-acting therewith amplify the effect of the latching arrangement. The latching arrangement (the grooves 67) may alternatively be placed at the front end of the unit.

It will be seen from FIG. 5 that the cutting elements 65, 75 have a common co-action plane. Each culling element consists of two blades with their edges located in said plane and defining a V-shaped angle. The blades situated on one side of the plane are generally parallel, wherewith the blades of the two cutting elements mutually overlap in the closed state of the culling unit.

What is claimed is:

1. In a cable-stripping pliers having two clamping jaws pivotally mounted, said jaws including two co-acting clamping elements for gripping a cable to be stripped; said pliers further having two legs pivotable relative to one another to pivotally drive the damping jaws, a culling unit including two pivotally mounted arms spring-biased away from each other and carrying at their free ends mutually coacting cutting elements for culling through a casing to be stripped from the cable, said culling unit being received between the damping jaws and arranged for movement therealong, a pull rod connected to the culling unit, and a mechanism connected to the pliers legs on one side and to the clamping elements and the pull rod on another side, said mechanism being adapted to cause the clamping elements and the culling unit to engage the cable initially when dosing the clamping jaws, and thereafter, while essentially retaining their grip, withdrawing the pull rod and therewith the cutting unit with the cable gripped by the damping elements upon continued movement of said legs towards each other, the improvement comprising:

said pull rod carrying a pin extending in a direction normal to a movement plane of the clamping jaws, said pin projecting freely from the pull rod; and said cutting unit having an opening in which the pin engages for entraining or dogging the cutting unit along the clamping jaws, one arm of said cutting unit carrying a body arranged for movement along said one arm and forming an abutment surface for an end of the cable to be stripped, said body carrying a latching finger which in one end position of the body engages a recess in the other arm, said recess for receiving said finger when the body is displaced towards said end position as the arms of the cutting unit are brought together such that engagement of said latching finger and said recess locks the arms of the cutting unit in a closed condition.

2. The cable-stripping pliers according to claim 1, wherein at least one of the arms of the cutting unit co-acts with an adjacent clamping jaw via displacement-permitting guide formations, said formations functioning to prevent displacement of the arm relative to the damping jaws along the pin; and said clamping jaws of said pliers being arranged to allow the cutting unit to be removed along the pin when said clamping jaws are in an open state and the cutting unit is in said closed condition.

3. The cable-stripping pliers according to claim 1, wherein at least one of the clamping jaws includes on an inner surface a groove which receives an adjacent arm of the cutting unit for guiding the cutting unit along the clamping jaws.

4. The cable-stripping pliers according to claim 1, wherein the body includes at least one latching tongue for co-action with a row of teeth on said one arm for releasable latching of the body in a set position along said row.

5. The cable-stripping pliers according to claim 1, wherein said recess is situated at one end of the cutting unit at which the arms are pivotally mounted.

6. The cable-stripping pliers according to claim 1, wherein the arms of said cutting unit have a tubular pivot beating which receives said pin.

7. A cutting unit for use between clamping jaws of cable-stripping pliers comprising two pivotally mounted arms spring biased away from each other and which at their free ends carry mutually co-acting cutting elements for cutting through a cable casing to be stripped from a cable, said cutting unit further comprising:

a body carried on one arm of said cutting unit and moveable along said one arm and forming an abutment surface for an end of the cable to be stripped, said body carrying a latching finger for engaging a corresponding recess on the other arm of said cutting unit by displacement of said body when the arms of the cutting unit have been brought together, engagement of said finger in said recess latching the arms of the cutting unit in a closed condition.

8. The cutting unit according to claim 7, wherein the body includes at least one latch tongue for co-action with a row of teeth on said one arm, for releasable latching of the body in a set position along said row.

9. The cutting unit according to claim 8, wherein the arms of the cutting unit have a tubular pivot bearing.

* * * * *